(12) United States Patent
Kulik

(10) Patent No.: US 6,251,826 B1
(45) Date of Patent: Jun. 26, 2001

(54) PROBIOTIC SOIL ADDITIVE COMPOSITION AND METHOD

(76) Inventor: Conrad J. Kulik, ANCON Bio-Services, 37177 Fremont Blvd., Suite F-5, Fremont, CA (US) 94536

( * ) Notice: Subject to any disclaimer, the term of this patent is extended or adjusted under 35 U.S.C. 154(b) by 0 days.

(21) Appl. No.: 09/415,937

(22) Filed: Oct. 8, 1999

(51) Int. Cl.⁷ .......................... A01N 25/12; A01N 65/00; C05F 11/00; C05G 5/00
(52) U.S. Cl. .................................... 504/117; 47/DIG. 10; 71/23; 71/24; 504/367
(58) Field of Search .................................... 504/117, 367; 47/DIG. 10; 71/23, 24

(56) References Cited

U.S. PATENT DOCUMENTS

| | | | |
|---|---|---|---|
| 4,171,968 | * 10/1979 | Farone | 71/77 |
| 4,404,767 | * 9/1983 | Enrich | 47/67 |
| 4,767,440 | * 8/1988 | Salac . | |

OTHER PUBLICATIONS

Internet Website of Canadian Iris Society (http://tor-pw.netcom.ca/˜cris/alfalfa.html). Alfalfa and Iries—Collection of Testimonials on use of Alfalfa [Retreived Mar. 28, 1997] Retrieved from Internet.*

Ingham, Elaine R., The Soil Foodweb—Its Importance in Ecosystem Health, Oregon State University, [Retrieved Nov. 15, 1996] Retrieved from Internet site www.rain.org/˜sals/ingham.html.*

Humate International, Inc. Catalogue—Information Bulletins—Humate International Inc,, Jacksonville, FL, Bulletins dated Mar. 1999 and Feb. 1998.*

* cited by examiner

*Primary Examiner*—S. Mark Clardy
(74) *Attorney, Agent, or Firm*—Howard E. Lebowitz

(57) ABSTRACT

The invention includes probiotic soil additive compositions including pulverized alfalfa, a wetting agent, granular humate ore, and a calcium source for promoting healthy plant growth without pesticides. Methods are disclosed for applying the additive, and optimizing application to maintain a preferred ratio of bacterial to fungal biomass or mycorrhizal coverage of the roots to promote disease resistant plant growth. A method is disclosed for applying the composition to promote deterioration of thatch when grass is grown. When applied to grass turf the invention imparts resistance to common grass turf diseases.

19 Claims, No Drawings

PROBIOTIC SOIL ADDITIVE COMPOSITION AND METHOD

BACKGROUND OF THE INVENTION

1. Field of the Invention

This invention relates to soil additive compositions and methods for using them to promote the healthy growth of plants while reducing or eliminating the need for pesticides.

2. Description of the Prior Art

Grass turf and other cultivated plant crops are often grown using chemical fertilizers and pesticides. While these materials support a highly productive agricultural environment, the use of pesticides produces a soil environment substantially different from the natural soil ecosystem which has been characterized as a foodweb in which plant species evolved Natural systems are characterized by a rich and diverse biomass activity with bacteria and fungi at the lowest level and predators such as protozoa, nematodes, earthworms, and higher level predators such as millipedes, centipedes, beetles, spiders and even small mammals . These organisms perform critical functions such as decomposing nutrients, retention of nutrients in the soil, symbiotic relationships involving transfer of nutrients into the roots, imparting immunity to disease, and controlling population of pathogenic organisms Prolonged use of pesticides has led to soil environments devoid of the natural bacterial and fungal activities and therefore also the larger predators in the foodweb. Pathogenic microorganisms gradually develop immunity to the pesticides and stronger and more potent chemicals are required. At the same time, these powerful chemicals are broad based toxins in themselves and are increasingly observed as pollutants in the air, soil and water and their use is increasingly regulated, restricted or prohibited.

There is a need for a soil additive which will promote the proper balance of microorganisms in the soil needed for healthy plant growth without or with minimal use of synthetic chemical pesticides. There is also a need for a method for systematically manipulating the activity of bacteria and fungi in soil to promote healthy plant growth.

Some applications of the use of alfalfa as a source of organic material are known. Prior to the availability and wide use of ammonia based fertilizers, alfalfa was been widely used for crop rotation, since as a legume it increased the nitrogen content of soil. Alfalfa is also known as a so-called "green manure", a crop which is cut before it reaches full maturity and then incorporated back into the soil for soil improvement. Ground alfalfa meal and alfalfa pellets have been reported to have efficacy as a fertilizer for roses and irises. Alfalfa meal and pellets are often listed as one of a plethora of sources of organic matter for organic vegetable gardening U.S. Pat. No. 4,767,440 discloses the use of pulverized wheat straw and alfalfa hay in substantially equal volumes as a potting medium to be used as a substitute for peat moss.

Alfalfa often has seeds of wild grasses and weeds incorporated with it which would present a problem if alfalfa would be used to fertilize a grass turf or in other large scale plantings where the wild grasses and weeds are objectionable. Also alfalfa meal or pellets do not quickly wet and incorporate into the soil, and can be blown by the wind or present an unpleasant appearance or interfere with golfers when placed on a grass golf turf.

There is a need for an alfalfa composition which avoids the spreading of weeds, which can be readily applied, and which will quickly disintegrate and incorporate into the soil.

The use of humate materials including peat moss as a potting soil and alternative source of organic material is known.

Calcium oxide and calcium carbonate use for soil pH control and as a plant nutrient is known. Surfactants have been added directly to the soil and to plant leaves.

The combination of these ingredients as proposed in this invention is not suggested in the prior art.

SUMMARY OF THE INVENTION

My invention is directed towards soil additives which when added to the soil will promote the proper balance of soil microorganisms which promote healthy plant growth without or with minimal use of synthetic chemical pesticides. A version of the soil additive comprises a mixture of granular humate ore, pulverized alfalfa mixed with a synthetic wetting agent, and a source of calcium which includes either calcium oxide or calcium carbonate.

The alfalfa serves to promote the growth of bacteria while the granular humate promotes the growth of fungi. The calcium source reacts with the granular humate ore and produces a reaction product which is readily used by the fungi. Granular humate ore refers to a substantially water insoluble solid material which is the product of decay of plant materials which were deposited in prehistoric times and acted on by microorganisms. Preferred sources of granular humate ores are peat and carbonaceous materials around peat deposits which have been mined, and dried in the sun. An alternative source of granular humate ores is low rank coals which have become oxidized.

The alfalfa is first prepared for use by pulverizing it to smaller than 48 mesh and preferably smaller than 100 mesh. This pulverizing destroys the seeds of weeds and grasses that may be present in the alfalfa It is also desired that the alfalfa is pulverized under conditions where the alfalfa is not exposed to temperatures where its own microbial content will be killed A good index is whether cyanobacteria are still present in the pulverized product. The alfalfa should not be heated above 185° F. and preferably not above 165° C. The invention also includes a wetting agent added to the pulverized alfalfa. The wetting agent causes the alfalfa to physically incorporate into the soil when watered and if the alfalfa is later pelletized causes the pellets to quickly deteriorate. A nonionic wetting agent is preferred to avoid addition of harmful salts to the soil A preferred embodiment of the invention further includes a high nitrogen chemical fertilizer, such as an ammonium phosphate, ammonium nitrate, urea, a urea-formaldehyde or methylene urea to the alfalfa to bring the entire fertilizer to between about 6 and 15% nitrogen. It is important to include the high nitrogen fertilizer to the alfalfa because it decreases the carbon to nitrogen ratio of the additive to the range preferred to promote the reproduction of bacteria. The pulverized alfalfa may finally be granulated, pelletized or extruded into a conveniently handled form preferably between about $\frac{1}{16}^{th}$ inch and $\frac{1}{8}^{th}$ inch in diameter and about ¼ inch and 2 inches long.

The alfalfa, granular humate ore and calcium sources may be premixed and applied together or they may be applied individually in a plurality of applications over the course of the year. Alternatively, some of the applications may be combined and other applications predominantly either humate or alfalfa. However, it is preferable to add calcium with each application of humate and wetting agent and nitrogen fertilizer with each application of alfalfa.

Another embodiment of the invention is a method to manipulate the bacteria to fungal ratio in the soil by varying the amount of humate application or alfalfa application. This is accomplished by measuring a ratio of bacterial to fungal content in the soil and comparing it to the natural ratio observed when members of the plant's family are found growing in an unfertilized natural environment. These natural ratios may be found in the literature or measured experimentally. A suitable ratio is the ratio of bacterial biomass to fungal biomass. Alfalfa is increased if it is desired to increase bacteria or humate if it is desired to increase fungus.

An object of the present invention is to provide an alfalfa composition for use as a soil additive which eliminates the effect of contamination with weeds, and renders the alfalfa into a form which quickly disintegrates in the soil.

A further object of the present invention is to provide a soil additive composition which when added to the soil will promote the balanced production of bacteria and fungi needed for plant growth.

A further object is to provide a soil additive composition which can be conveniently varied to manipulate the ratio of fungal to bacteria activity of the soil by varying the composition of the additive.

A further object is to provide a soil additive composition which when added to the soil will promote healthy plant growth while reducing or eliminating the use of pesticides.

These and other features, aspects, and advantages of the present invention will be come better understood with reference to the following description and appended claims.

DESCRIPTION OF THE INVENTION

The present invention includes several related soil additive compositions and methods for using them to promote healthy plant growth with minimal or more preferably without the use of pesticides. The elements of the invention cooperate to restore and maintain fungal and bacterial populations in the proper balance in the soil. These bacteria and fungi are themselves beneficial to plant health and growth, and are the lowest level of a food chain including predators such as protozoa, nematodes, earthworms, and higher level predators such as millipedes, centipedes, beetles, spiders and even small mammals which are also beneficial. These organisms perform critical functions such as decomposing nutrients, retaining nutrients in the soil, symbiotic relationships involving transfer of nutrients into the roots, imparting immunity to disease, and controlling population of pathogenic organisms. Bacteria, fungi, and the higher predators are typically depleted in soils which have been maintained with chemical fertilizers and pesticides. It is often necessary or desirable to reduce or eliminate the use pesticides. The present invention is useful in restoring the soil environment in such circumstances. Primary elements of the compositions include granular humate ore, alfalfa mixed with a synthetic wetting agent, and a calcium source which can include either calcium oxide or calcium carbonate.

The word humate is derived from the word humus which refers to organic residues in the soil which are products of the decomposition of plant matter. Humus is an important soil constituent for enhancing plant growth. Humic acid is the portion of soil humus that is soluble in alkaline solution but insoluble in acid solution. Humic acid is often added to soil to increase fertility. Humic acid is found in rotting vegetable matter, compost and manure. Humic acid is also be obtained from peats, manure, lignite, leonardite and low rank or even higher rank coals by chemical processes typically including extraction with caustic soda or biological processes. These materials from which humic acids are produced are frequently called humates.

In this invention, granular humate ore is used in a more limited sense, including potential sources of humic acids deriving from the decayed plant materials from ancient plant life which were deposited in the earth millions of years ago and were subject to biological and geological processes over time in the process which ultimately leads to the formation of coal. Granular humate ores include peats (a coal precursor which is characterized by having some free cellulose) and carbonaceous materials mined in the vicinity of peat deposits, low rank coals, naturally oxidized coals such as leonardite, and coals and artificially oxidized or treated coals from which humic acids can be produced. Materials such as compost, manures, and recently decayed plant or animal life are not included, nor are solutions of humic acids which have been produced and extracted from humus or granular humate ores.

Granular humate ore is a solid material which is substantially insoluble in water. If the material is a peat or peat like material it has typically been broken up and air dried in the sun. Granular humate ores are characterized by their cation exchange capacity, which is often expressed in the units of milliequivalents per 100 grams (meq. per 100 g.). Granular humate ores have cation exchange capacities between about 25 and about 600 meq. per 100 g. Beneficial results can be obtained over this entire range though the preferred sources are peat or materials mined around peat deposits having a cation exchange capacity over 300 meq. per 100g and preferably between about 500 meq. per 100 g. and about 600 meq. per 100 g. A suitable granular humate ore is a material mined around a peat deposit having a cation exchange capacity of about 500 meq. per 100 g sold under the trade name HUMATE AG 1635 sold by Humate International, Inc.

Granular humate ore is the component of the invention which promotes primarily the growth of fungal mass in the soil. It will be discussed that it is desired to maintain a certain ratio of fungal mass to bacterial mass in the soil depending on the plant family. Granular humate ore is used rather than humic acids, composts, animal manures or the like because granular humate ore releases its organic materials in a slow and sustained manner, rather than quickly. Granular humate does not contain proteins, fats, or carbohydrates and is principally broken down and utilized by fungi. I have found that the beak down of granular humate is greatly facilitated by a calcium source which should be copresent with the granular humate ore. The calcium source could include either calcium carbonate or calcium oxide. Calcium is also a plant nutrient and can be used for soil pH control and may be administered at different times during the year, however for the best operation of this invention it is important to apply the calcium contemporaneously with the granular humate ore. I have found that other forms of calcium such as calcium sulfate are not acceptable substitutes for calcium carbonate or calcium oxide. Calcium carbonate is the preferred form.

Alfalfa for this invention should be pulverized to a size which will pass through a 48 mesh screen and preferably a 100 mesh screen. The size is important because alfalfa will contain seeds from weeds and wild grasses which will contaminate the soil. Pulverizing the alfalfa destroys these seeds. This is particularly important if the compositions will be applied on grass. Alfalfa normally contains a variety of microbes and notably cyanobacteria. It is preferred that the alfalfa be treated in a manner which leaves a population of cyanobacteria remaining after pulverizing. Cyanobacteria are killed at temperatures in the range of 165° F. to about 185° F. so it is preferred that the alfalfa not be exposed to a temperature above 185° F. and preferably not above 165° F.

When alfalfa is applied alone to soil it does not quickly break down and deteriorate. This is particularly true when the pulverized alfalfa is formed into small pellets, eurudates or granules which are typically from about $\frac{1}{16}^{th}$ of an inch in diameter to ¼ inch in diameter and ½ inch to an inch long. Such pellets are a convenient way to handle and distribute the alfafa without excessive wind losses and are a preferred form of the product Pellets, extrudates, and granules may be formed in any of a variety of conventional equipment used for that purpose in industry. A preferred device is a pellet mill. Rapid break down of the alfalfa is important to make it available to soil bacteria. In the case where the invention is used on grass covered soil of a lawn or golf course the presence of the alfalfa pellets is detrimental to the appearance and interferes with golfing making alfalfa alone generally unsuited for such applications. If the alfalfa is not pelletized, there is excessive wind loss. I have found that the addition of the wetting agent to the alfalfa makes the alfalfa deteriorate rapidly, usually within a few hours, while a much longer period would be required without the wetting agent. Preferred wetting agents are in the class of nonionic wetting agents, though other wetting agents such as anionic, cationic or ampholytic agents may also be use. A preferred way to apply the wetting agent is to mix a liquid wetting agent with the pulverized alfalfa such that the wetting agent is absorbed by the alfalfa. The amount of wetting agent is between about 0.25 gallons per ton and 2.5 gallons per ton of alfalfa, and more preferably between 0.5 and 1.5 gallons per ton of alfalfa. Since the wetting agents are an expensive component, I prefer to use as little as possible while getting a rapid enough deterioration of the alfalfa. A preferred nonionic wetting agent is sold under the trade name AQUA-AID manufactured by Aqua-Aid, Inc. and contains alkyl ethoxylates, dodecyl benzene sulfonates, and oleic diethanolamides.

In order for the alfalfa to be efficiently used by bacteria it is desirable to lower the carbon to nitrogen weight ratio from 12 or 13 to 1 found in alfalfa to a value below 10. This allows the alfalfa to be consumed by the microbes, principally bacteria, and become incorporated in the microbial mass which will ultimately be consumed by predators and converted into a form useable by the plants. I prefer to mix the alfalfa and wetting agent with one or more high nitrogen fertilizers for this purpose. Suitable fertilizers for mixing include urea, urea formaldehyde products such as urea formaldehyde, polymethylene urea, methylene urea, methylene diurea; triazone and substituted triazones; isobylene diurea; monomethylol urea; crotonylidine diurea; diammonium and monoammonium phosphates; urea phosphate; ammonium nitrate; ammonium sulfate; animal blood; tage; and cotton seed. Tankage is a byproduct of animal slaughtering made up of meat scraps, bone, and blood.

Calcium nitrate and or potassium nitrate may be optionally added. These compounds do not promote bacterial growth but are a form of nitrogen readily used by the plants without microbial action. Such compounds are often desired because some time is required for the degradation products from the alfalfa and high nitrogen fertilizers to be available to the plants.

I prefer to limit the addition of total soluble phosphates, such as ammonium phosphates used as sources of high nitrogen content and other soluble phosphates such as potassium phosphate which may be added for phosphate content, when expressed as $P_2O_5$ to less than 2%, preferably less than 1%, and most preferably about ½% of the total mixing. The reason for this is that in the natural microbial system promoted by my invention, phosphorus is transferred to the plants from insoluble sources through the symbiotic associations of fungi and plant roots known as mycorrhizae. These associations are reduced or absent in soil which has been fumigated with fungicides and in such systems without sufficient microbial presence it is necessary to supply phosphorus in a water soluble form which be taken up directly by the roots. The mycorrhizae do not thrive and remain attached to the roots if there is too much soluble phosphate available. Mycorrhizal activity is measured as a percentage of root coverage, which can be measured in the laboratory by well known procedures.

A preferred mixture includes alfalfa, wetting agent, with nitrogen fertilizer components added to bring the nitrogen content between about 6% and about 15% more preferably between 6% and 10%.

The alfalfa and wetting agent are preferably mixed with the high nitrogen fertilizers and optional nitrate additives. The mixture can be applied in fine pulverized form or preferably manufactured into pellets, extrudates, granules or other agglomerates. Pellets, extrudate, and granules may be formed in any of a variety of conventional equipment used for that purpose in industry. A preferred device is the device commonly referred to as a pellet mill, where the material is forced through openings in a drum rotating around one or more internal rollers. Other devices such as a compacting mill are also suitable as are the many devices and methods for size enlargement described in pages 8–60 to 8–72 of Perry's Chemical Engineer's Handbook, Sixth Edition, McGraw—Hill, 1984, which is hereby incorporated herein by reference. The purpose of size enlargement is convenience of application and to prevent wind loss. Binders and lubricants may be used. When a pellet mill is used a preferred lubricant is rice hulls.

The alfalfa and additives mixture may be applied alone or combined with the granular humate ore and calcium components. A preferred annual program includes some applications where all the components are applied together and other separate additional applications of alfalfa, wetting agent, high nitrogen fertilizer, and optional nitrates, and other applications of only calcium. For the best results of this invention, alfalfa, wetting agent, and high nitrogen fertilizes are added together and calcium is added with granular humate ore. It is preferable to combine the ingredients where possible because their mutual interaction is beneficial, and to reduce the additional costs of separate applications.

When a grass is the plant being grown, it is desirable to add the combined applications and humate—calcium applications so that as much as possible of the materials are applied within the thatch zone, preferably at least 50%. Thatch is a collection of trimmings and fallen plant materials which accumulates at the soil surface. Thatch accumulation is a problem because it impedes the flow water into the soil. The ingredients of this invention promote the growth of microbial species which quickly decompose the thatch and recycle its ingredients to the soil foodweb in a manner ultimately useable by the grass. A convenient way to make the applications is to apply the soil additives of this invention immediately following aerification. Aerification is a process where small holes are mechanically made in the soil to incorporate air. When the ingredients are applied after aerifacation they fall into the holes. It is preferable to drag over the soil with large mats after application to further fill the aerification holes with the additive ingredients.

EXAMPLE 1

Preferred alfalfa mixtures were prepared by mixing alfalfa, which had been pulverized to −100 mesh and was checked for positive cyanobacteria content, with the AQUA-AID wetting agent and methylene urea high nitrogen fertilizer as indicated in the following proportions:

|  | Mixture 1 | Mixture 2 |
|---|---|---|
| Alfalfa | 82.1% | 52.7% |
| AQUA-AID anionic wetting agent | 0.4% | 0.6% |
| Methylene urea | 17.5% | 15.2% |
| Cotton seed | — | 5.6% |
| Animal Blood | — | 11.1% |
| Ammonium nitrate | — | 3.3% |
| Monoammonium phosphate | — | 0.7% |
| Potassium sulfate | — | 10.2% |
| Micro-nutrients | — | 0.6% |
| Nitrogen Content | 7% | 9% |

In Mixture 2 potassium sulfate and micro-nutrients were added for convenience as conventional plant fertilizer components.

EXAMPLE 2

A preferred annual treatment program is as follows in pounds per 100 square feet of soil surface:

|  | Range | Preferred Range |
|---|---|---|
| Alfalfa mixture of Mixture 1 or 2 in Example 1- | 2–10 | 3–7 |
| Granular Humate Ore- | 0.5–4 | 1–3 |
| Calcium Carbonate or Calcium Oxide (as Ca)- | 0.8–4 | 1–3 |

The annual treatments are preferably divided into several applications per year with an application of all the ingredients applied together in the spring and fall, supplemented by additional applications of the alfalfa mixture in three additional applications, one in the spring, one in the early summer, and one in the fall. Calcium may be divided roughly equally between 5 to 9 applications per year, though applications including granular humate should preferably always include contemporaneous applications of calcium. Another suitable scheme is to apply three combined applications supplemented by 2 to 6 supplemental applications of calcium.

Where grass is being treated it is preferable to make the applications coincide with aerification of the soil so that the additives may be injected into the aerification holes and thus be deposited into the thatch zone. The additives may be applied to the soil by conventional equipment such as a drop spreader or distributed with a broadcast spreader. If the additives are applied after aerification it is preferable to use dragging to fill the holes.

EXAMPLE 3

A plot of grass was treated with an alfalfa mixture approximately as Mixture 2 in Example 1, granular humate ore HUMATE AG 1635, and calcium carbonate. The granular humate was applied at an annual rate of 2 pounds per 100 square feet, and alfalfa mix at an annual rate of 5 pounds per 100 square feet, and calcium carbonate at an annual rate 4.5 pounds per 100 square feet (1.8 pounds per 100 square feet expressed as Calcium). The humate was applied in two applications, one in the spring and one in the fall. The alfalfa mixture was split between 5 applications two corresponding with the humate applications and two supplemental applications in the spring and one in the fall. No pesticides were used, though these had been previously used extensively leaving the soil depleted in microbial content, particularly depleted in fungi and dominated by bacteria. The visual appearance of the grass improved markedly soon after treatment started and after the first six months of treatment the fungal mass had increased substantially. The mycorrhizal colonization increased with treatment. The fungal disease in the roots decreased substantially, even though the use of fungicides was discontinued entirely. The grass was free of apparent turf grass diseases and pests, including anthranose, necrotic ring spot, root eating nematodes, pythium, and fusarium. The turf was free of the condition commonly known as "black layer", a combined microbial and physical conditions frequently found on golf course turf. The table, below contains soil and root analysis data from the test.

|  | Bacterial Biomass ($\mu$g/g) | Fungal Biomass ($\mu$g/g) | Bacterial to Fungal Ratio | Percent root coverage by Mycorrhizae | Percent fungal diseased roots |
|---|---|---|---|---|---|
| Treated | 124 | 31 | 4 | 3 | 15 |
| Untreated | 298 | 15 | 20 | 2 | 25 |

Note that the ratio of bacterial to fungal biomass in above table decreased from 20 in the untreated soil to 4 in the treated sample. Different botanical families have different ranges of characteristic ratios of bacterial to fungal biomass which are observed when plants of that family grow uncultivated in nature. For grasses (Poaceeae) the range of ratios is about 0.65 to 2. These characteristic ratios can often be found in the literature, or alternatively can be measured expermentally. The analyses for bacterial biomass, fungal biomass, Micorrhizal coverage, and diseased roots are well known laboratory tests. The soil in this case started out deficient in fungal mass and is progressing to within the natural range. It is preferable to have the bacterial to fungal ratio as near as possible to the natural range to promote optimal plant health without use of pesticides and fungicides. The soil in this example may reach a steady state within the desired zone. If it does not reach the desired range it can be adjusted by increasing the humate treatment rate to favor fungal mass growth. If the ratio had been to high in fungal mass, the alfalfa mixture application rate would be increased to increase bacterial growth.

EXAMPLE 4

I have attempted to treat soils with just one of the component of the invention, either the granular humate/calcium or alfalfa component, and I have found that better results are obtained with the mixture, particularly in obtaining disease resistant growth in soils which have been previously treated with pesticides. When I treated grass growing in soils which were fungus dominated with granular humate ore/calcium treatment alone, after a period of time the soil became fungal dominated and the treatment was detrimental in that the grass's failure to thrive was apparent from visual observation. In contrast similar grasses treated with combined treatment of alfalfa mixture and humate ore produced rapid improvement.

Examples of the naturally occurring ratios of bacterial to fungal biomass are as follows: Grasses –0.65 to 2, Berries, shrubs, grapes –0.2 to 0.5, Deciduous trees –0.1 to 0.2, and Conifers –0.01.

Since my invention relies on establishing a balanced microbial foodweb to promote the growth and health of the plants, and since the environment thus formed establishes disease and pest resistance, I prefer to minimize the use of synthetic pesticides and more preferably not to use any form of synthetic pesticides. When I refer to pesticides I include all synthetic chemicals which are used for controlling, preventing, destroying, or repelling pests, including fugicides, herbicides, insecticides, nematicides, desiccants, and defoliants. When my invention is applied to grass, I have found that the grass is generally resistant to common grass diseases and pests including anthanose, necrotic ring spot, root eating nematodes, pythium, fusarium, and black layer.

A preferred method of implementing my invention is to apply alfalfa mixture, granular humate and calcium to the soil as described in Examples 2 and 3 while periodically monitoring the bacterial to fungal biomass ratio in the soil and comparing it to the natural range observed when plants of the same family grow uncultivated in nature. I prefer to monitor the soil about every 3 months. The application rates are adjusted by increasing the alfalfa treatment rate if the ratio is on the low side of the range or increasing the granular humate treatment rate if the ratio is on the high side of the range, or not making an adjustment if the ratio is within the range.

An alternative method which is particularly preferable for promoting the growth of grapes is to apply alfalfa mixture, granular humate, and calcium to the soil as described in Examples 2 and 3 while periodically monitoring the mycorrhizal coverage of the roots. I prefer to maintain a coverage above 40% for grapes. If the coverage is below about 40% the granular humate treatment rate should be increased. Maintaining this mycorrhizal coverage is indicative of healthy grape plants and improves the juice quality.

The invention can also be applied to the soil when seeds are planted. In this case I prefer to add the alfalfa mixture, granular humate ore, and calcium source to the soil contemporaneously with the seeds. I have found that this treatment leads to improved germination rates and plant health. The preferred annual application rates in pounds per 100 square feet of soil surface are as follows:

|  | Range | Preferred Range |
| --- | --- | --- |
| Granular humate Ore | 0.2–2 | 0.5–1.5 |
| Calcium source (as calcium) | 0.1–1 | 0.3–0.7 |
| Alfalfa, wetting agent, high fertilizer mixture | 0.5–2.5 | 0.7–1.5 |

In soils which have been extensively treated with pesticides it is possible that there will be little or no bacterial or fungal biomass present. While these microbes are generally ubiquitous, it is often preferable to inoculate the soil with microbes. Inoculants are available as commercial products which may be applied at the beginning of treatment.

It is necessary to apply sufficient fertilizers containing nitrogen, potassium, phosphates and micro-nutrients needed to sppplement the values present in the soil additive depending on the options chosen. The requirements are well known for particular plants.

While I have described preferred embodiments of the invention, it is apparent that modifications may be made thereto, and I therefore wish it to be understood that the invention is not limited to the specific embodiments disclosed, but rather I intend all embodiments which would be apparent to one skilled in the art which come within the spirit and scope of the invention.

I claim:

1. An alfalfa based pelletized soil additive for application onto a soil surface made by the process comprising the steps of:
    a) blending pulverized alfalfa with a synthetic wetting agent such that said wetting agent is absorbed into said pulverized alfalfa to form an additive blend; and
    b) forming the additive blend into additive pellets; whereby the additive pellets so formed may be conveniently applied to the soil surface and will quickly deteriorate when water is applied.

2. The alfalfa based pelletized soil additive described in claim 1 wherein the process further comprises blending at least one nitrogen rich fertilizer with the additive blend prior to the step of forming the additive blend into additive pellets, whereby the at least one nitrogen rich fertilizer becomes part of the additive blend, and wherein the amount of said nitrogen rich fertilizer is sufficient that the nitrogen content of the additive blend is in the range between about 6% and about 15% by weight.

3. The alfalfa based pelletized soil additive described in claim 2 wherein the synthetic wetting agent is a liquid wetting agent and the quantity of wetting agent is in the range between about 0.5 gallons per ton of the additive blend and about 2.0 gallons per ton of the additive blend.

4. The alfalfa based pelletized soil additive described in claim 3 wherein the pulverized alfalfa is of a size which will pass through a 48 mesh screen.

5. The alfalfa based pelletized soil additive described in claim 4 wherein the process further comprises blending granular humate ore with said at least one high nitrogen fertilizer to form said additive blend.

6. The alfalfa based pelletized soil additive described in claim 5 wherein said granular humate ore is present in said additive blend in a concentration in the range from about 20% to about 50%.

7. The alfalfa based pelletized soil additive described in claim 6 wherein said granular humate ore has a cation exchange capacity greater than 300 meq per 100 grams.

8. A method of using pulverized alfalfa as a soil additive for application onto a soil surface, comprising the steps of:
    a) blending the pulverized alfalfa with a synthetic wetting agent such that the synthetic wetting agent is absorbed into the pulverized alfalfa to form an additive blend;
    b) forming the additive blend into additive pellets;
    c) applying the additive pellets onto the soil surface; and
    d) applying water to the additive pellets; whereby the additive pellets may be conveniently applied to the soil surface and the pellets will quickly deteriorate into the soil surface when watered.

9. The method of using pulverized alfalfa as a soil additive described in claim 8 wherein the method further comprises blending at least one nitrogen rich fertilizer with the additive blend prior to the step of forming the additive blend into additive pellets, whereby the at least one nitrogen rich fertilizer becomes part of the additive blend, and wherein the amount of said nitrogen rich fertilized is sufficient that the nitrogen content of the additive blend is in the range between about 6% and about 15% by weight.

10. The method of using pulverized alfalfa as a soil additive described in claim 9 wherein the synthetic wetting agent is a liquid wetting agent and the quantity of wetting agent is in the range between about 0.5 gallons per ton of the additive blend and about 2.0 gallons per ton of the additive blend.

11. The method of using pulverized alfalfa as a soil additive described in claim 10 wherein the pulverized alfalfa is of a size which will pass through a 48 mesh screen.

12. A method for promoting the growth of plants, said plants belonging to a botanical family, in soil having a top surface, comprising the steps of:
   a) applying a granular humate ore to said soil at a granular humate ore treatment rate between 0.5 and 4 pounds per year per 100 square feet of said soil top surface;
   b) applying the alfalfa based pelletized soil additive according to of claim 2 to said soil at a treatment rate between 2 and 10 pounds per year per 100 square feet of said soil top surface; and
   c) applying a calcium source including a calcium compound chosen from the group consisting of calcium oxide and calcium carbonate to said soil at a calcium treatment rate between 0.8 and 4 pounds of calcium per year per 100 square feet of said soil top surface.

13. The method described in claim 12, wherein said granular humate ore has a cation exchange capacity greater than 300 meq. per 100 grams.

14. The method defined in claim 12 wherein said granular humate ore, said alfalfa based pelletized soil additive, and said calcium source are applied to said soil in a plurality of treatments throughout a year.

15. The method defined in claim 12 wherein each application of said granular humate ore is applied contemporaneously with an application of said calcium source.

16. The method defined in claim 15 wherein said plants are grass, said soil contains a thatch zone disposed below said soil top surface, and greater than 50% of the said granular humate ore and greater than 50% of the said calcium source are applied to the soil within said thatch zone.

17. The method defined in claim 15 further comprising the steps of:
   a) measuring a ratio of bacterial to fungal biomass content in said soil;
   b) comparing said ratio to a reference value range characteristic of said botanical family to which said plants belong when said botanical family grows naturally without cultivation;
   c) increasing the treatment late of said alfalfa based pelletized soil additive if said ratio of bacterial to fungal biomass content is lower than said reference value range; and
   d) increasing the treatment rate of said granular humate ore if said ratio of bacterial to fungal biomass content is higher than said reference value range.

18. The method defined in claim 15 wherein said plants are grape plants having roots covered by mycorrhizae and further comprising the steps of:
   a) measuring the per cent mycorrhizal coverage of said roots;
   b) determining whether said percent mycorrhizal coverage is greater than about 40%; and
   c) increasing said granular humate ore treatment rate if said mycorrhizal coverage is less than about 40%.

19. A method for promoting the germination and growth of plant seeds in soil having a top surface, comprising the steps of:
   a) applying a granular humate ore to said soil in a quantity between 0.2 and 2 pounds per 100 square feet of said soil top surface contemporaneously with the planting of said seeds in said soil;
   b) applying the alfalfa based pelletized soil additive according to claim 2 to said soil in a quantity between 0.5 and 2.5 pounds per 100 square feet of said soil top surface contemporaneously with the planting of said seeds in said soil; and
   c) applying a calcium source including a calcium compound chosen from the group consisting of calcium oxide and calcium carbonate to said soil in a quantity of between 0.1 and 1 pounds of calcium per 100 square feet of said soil top surface contemporaneously with the planting of said seeds in said soil.

* * * * *